Inventor
Robert L. Opila

March 8, 1966 R. L. OPILA 3,239,378
PROCESS FOR PRODUCING DEXTROSE
Filed April 13, 1964 2 Sheets-Sheet 2
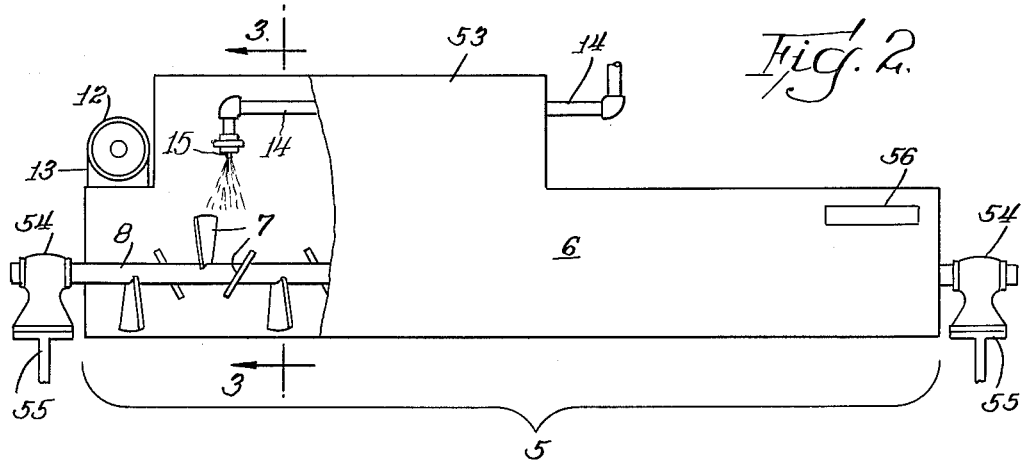
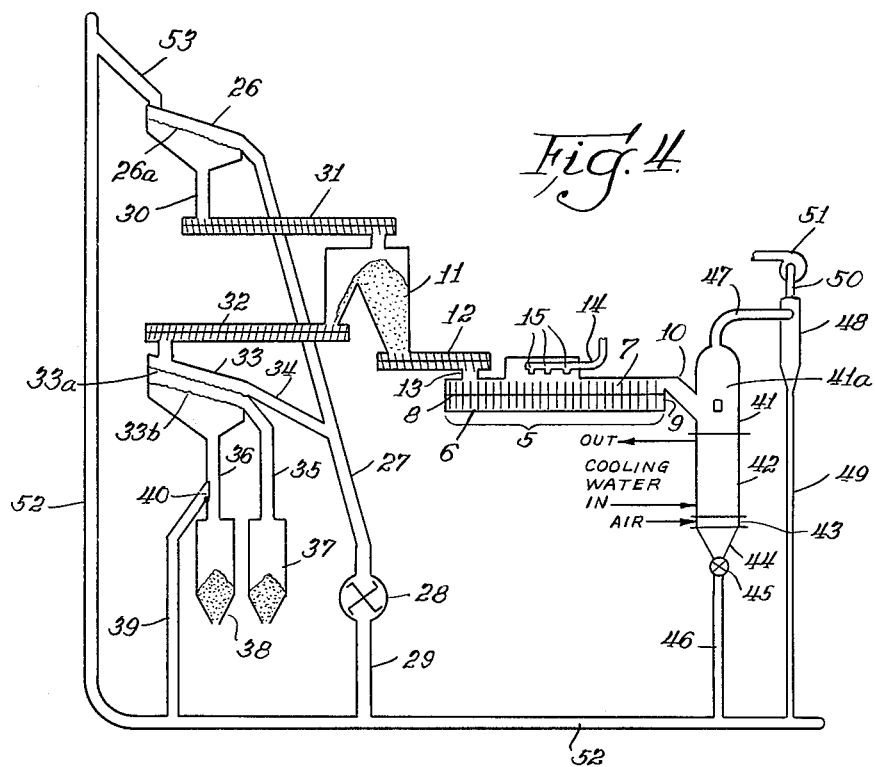
Inventor
Robert L. Opila
By Mildred Oncken
M. Lois Dierstein
Attys.

United States Patent Office 3,239,378
Patented Mar. 8, 1966

3,239,378
PROCESS FOR PRODUCING DEXTROSE
Robert L. Opila, Westchester, Ill., assignor to Corn Products Company, New York, N.Y., a corporation of Delaware
Filed Apr. 13, 1964, Ser. No. 359,069
7 Claims. (Cl. 127—60)

This invention relates to a new and improved method for production of anhydrous dextrose, a substantial amount of which is in the beta form, from starch hydrolysates. The invention relates particularly to crystallizing dextrose from starch hydrolysates which have been obtained by carrying out the hydrolysis of starch to the maximum D.E. level practicable or possible and which contain only small amounts of non-dextrose substances. For convenience, I shall refer to such hydrolysates as "total starch hydrolysates" to distinguish them from starch hydrolysates, such as corn syrups, and the like.

The main object of this invention is to provide a process for the production of anhydrous dextrose which is highly and readily soluble in water and which is stable toward changes in solubility.

Another object is to provide a process for the production of anhydrous dextrose containing a high proportion of the beta form.

Another object is to provide a process for producing anhydrous dextrose from total starch hydrolysate liquors wherein the entire liquor is crystallized without formation of mother liquor, thereby eliminating the necessity of centrifuging the dextrose crystals, reprocessing the mother liquor for additional yield of dextrose and various other modifications of these steps.

A further object of this invention is to provide a process which utilizes the sensible heat of the liquor being crystallized and the heat liberated by crystallization of the dextrose therefrom to effect cooling by evaporative cooling and drying of the crystallized dextrose.

Other objects will appear hereinafter.

Processes for producing dextrose which contains a considerable amount of the beta form are known. For example, U.S. Patents 2,369,231 and 2,854,359 are directed to this concept. However, the processes described and claimed in the aforementioned patents have certain limitations and as will be apparent from the description which follows my invention provides an improvement thereover.

In carrying out my invention, I spray onto or mix a dextrose liquor with a seed bed under controlled conditions of temperature to obtain crystallization of dextrose and use the sensible heat from the dextrose liquor and the heat liberated by crystallization of the dextrose, to cool by evaporative cooling and dry the crystallized dextrose. The seed bed may consist of any dextrose crystals, but anhydrous crystals are preferred, for example, previously dried material resulting from my process.

More specifically, my invention comprises spraying a dextrose liquor having a temperature between about 105 and about 150° C. onto a dextrose seed bed which is agitated and has a temperature between about 10 and 40° C. The liquor and seed bed are mixed continuously and intimately in a mixing zone for a short period of time in order to induce substantially complete crystallization of the dextrose in the liquor. Then the resultant crystallized material is removed from the mixing zone at a temperature of about 30 to 60° C. into a stream of air having a temperature of about 5 to 35° C. The product is cooled to a temperature of about 10 to 40° C. and residual moisture removed therefrom by means of the sensible heat from the liquor being crystallized and the heat liberated by crystallization of the dextrose. The product may then be screened and packed. A portion of the product may be used for seed in a succeeding operation.

The novel features of my invention consist in crystallizing dextrose-containing liquors in a temperature range which the prior art has presumed to be that for hydrate crystallization. However, I can obtain substantially anhydrous crystals of dextrose in this range because I maintain a relative humidity of below 60 percent, and preferably below 45 percent, of the cooling air stream to effect evaporation of water which would otherwise form the hydrate dextrose. Another novel feature of my invention is that I use the sensible heat of the dextrose liquor to be crystallized and the heat of crystallization of the dextrose crystals to effect evaporation of moisture from the crystals.

The dextrose liquor used in my novel process should contain at least about 90 percent of dextrose and about 88 to 98 percent dry substance. Total hydrolysate liquors resulting from the enzymic conversion of starch are eminently suitable for purposes of the present invention since they contain relatively low amounts of non-dextrose substances. The total hydrolysate liquor may be derived from any starch and may be made by processes well known to those skilled in the art. It is preferred to refine the total hydrolysates and the preferred method of refining, after clarification to remove trace quantities of insoluble material, is to use ion exchange resins and vegetable carbon to remove trace quantities of ash and protein, as well as color bodies present in the clarified hydrolysate.

The nature of the invention will more fully appear from the following description, to be read in connection with the accompanying drawings in which:

FIGURE 1 diagrammatically illustrates a preferred embodiment for my invention.

FIGURE 2 is a vertical partial sectional view (on an enlarged scale) of the apparatus of FIGURES 1 and 4 used for commingling the liquid and solids.

Figure 1:
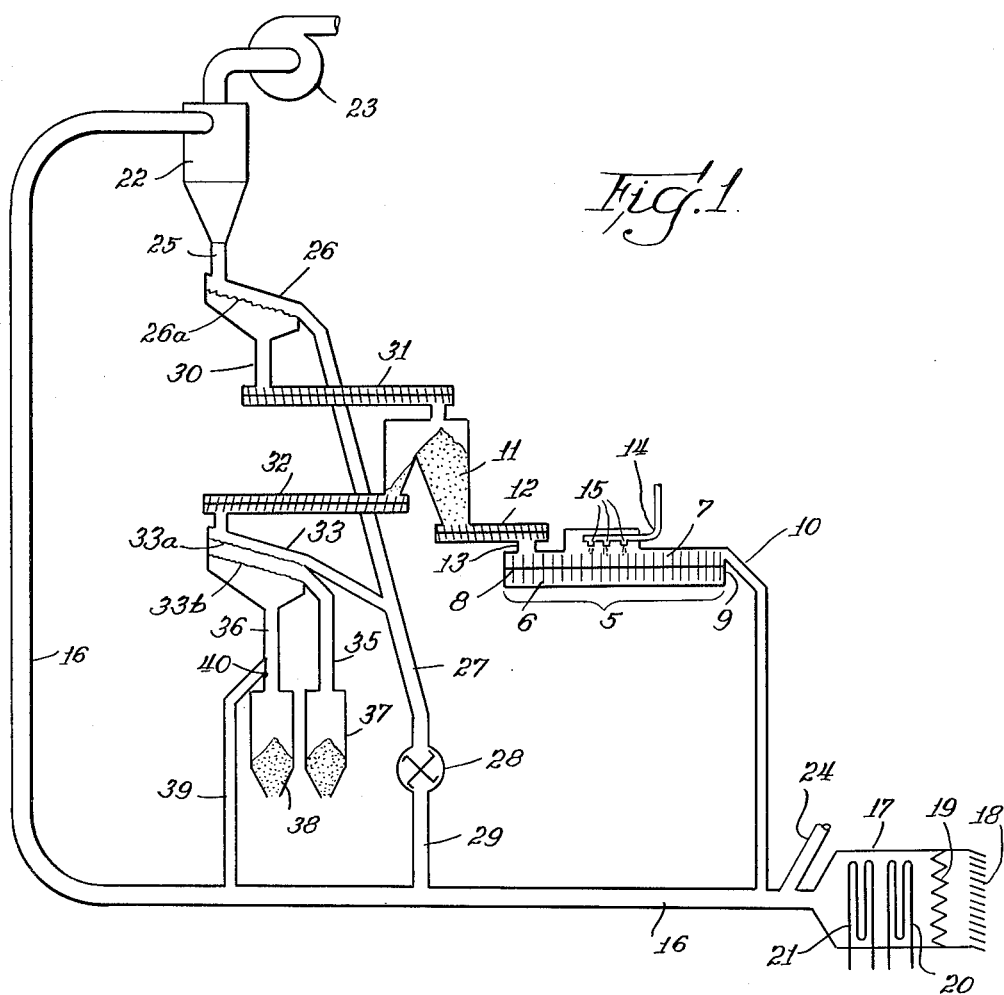
Figure 3:
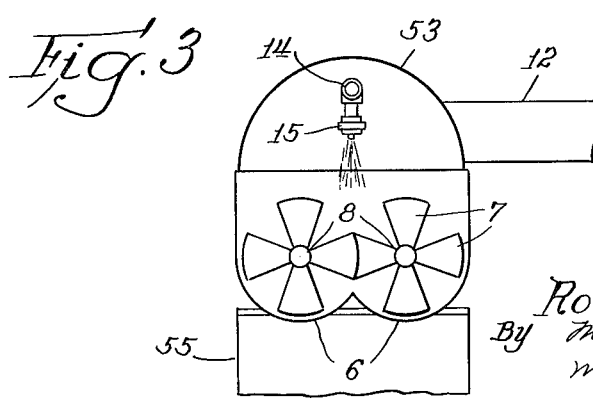
FIGURE 3 is a vertical sectional view taken on line 3—3 of FIGURE 2.

FIGURE 4 diagrammatically illustrates an alternate embodiment for carrying out my invention.

Referring to the figures, the numeral 5 designates generally a pug mill mixer, comprising a trough 6 within which short and stout paddles 7 revolve in opposing directions on two shafts 8 supported at the ends by suitable bearings 54 which in turn are mounted on bearing bases 55. By way of illustration, the pug mill will be described, but any blender or mixing device which provides rapid and intimate mixing may be used. The mixer used to commingle the liquid and solids is discharged by overflowing the mixer, as, for example, at the end or side 9 of the mixer through an opening 56 into a conduit 10.

For the continuous commingling of total starch hydrolysate or dextrose liquor and dextrose seed in the pug mill mixer, previously dried crystallized dextrose is supplied to the mixer from hopper 11 by means of a screw conveyor 12 and conduit 13. The crystalline dextrose, which acts as seed in the production of dextrose from the liquor, forms a bed which is maintained in a state of agitation by the rotation of the two shafts with the attached paddles. Dextrose liquor is supplied to the header 14, which is installed in between and parallel to the rotating shafts of the mixer and inside a spray hood 53, and is discharged therefrom through a multiplicity of spray nozzles 15. The dextrose-containing liquor is discharged under a pressure of 2.5 to 11.5 kg./cm.$^2$, and the nozzles are of such a type as to create a finely dispersed fan-shaped spray of the discharged liquor. The spray is directed substantially perpendicular against and upon the surface of the actively agitated bed of dextrose crystals. The vertical distance between the nozzles employed in carrying out this invention and the seed bed is 250 to 500 mm., with 375 to 400 mm. being the preferred distance between the nozzles and the surface of the seed bed. The vertical distance is naturally a function of the design of the nozzle and the resulting spray pattern, and the limits given above are by way of illustration, and are not limiting in any way.

In practicing the invention to produce the preferred type of product, it has been found expedient to introduce previously crystallized and dried dextrose into the mixer at a temperature of 10 to 40° C., 27 to 35° C. being the preferred temperature range. The dextrose-containing liquor is concentrated to a solution containing 88 to 98 percent dry substance and is introduced into the mixer at temperatures of 105 to 150° C., the preferred range being 112 to 122° C. in order to minimize color development while maintaining a sufficiently fluid dextrose liquor. By varying the internal pressure within the evaporator, many combinations of liquor temperatures and concentrations are possible, as is well known by one skilled in the art. An essential requirement of the evaporator is a short in-process time in order to minimize color development in the dextrose-containing liquor.

By varying the amount and temperature of the seed supplied to the mixer and the amount, concentration and temperature of the dextrose liquor, and holding the commingled materials in the mixer for from about 5 to 15 minutes, depending upon the specific combination of variables selected, an essentially completely crystallized product is discharged from the mixer at a temperature of 30 to 60° C. into conduit 10. In the preferred embodiment shown in FIGURE 1, the essentially completely crystallized product at a temperature of 30 to 60° C. is transported by gravity into an air stream constrained by the air duct 16. The air introduced into the air duct is normally ambient air, which enters the air duct through a housing 17 equipped with louvres 18 which prevent snow or rain from entering the housing. The entering air is filtered through a dust filter 19 prior to being mixed intimately with the essentially crystallized product discharged from the mixer. In this way, air-borne dust, etc., is prevented from being mixed with the product. Should seasonal weather variations adversely affect the temperature and/or humidity of the ambient air, then proper adjustments can be made in the condition of the air by use of the cooling coils 20 and/or the heating coils 21.

The crystallized dextrose intimately contacting the cooling air in the air duct is simultaneously dried, cooled and conveyed to a product separator, such as a cyclone 22, where the dried cooled crystallized product is separated from the conveying air stream. The motive force required to impel the air used for cooling and conveying is supplied by the fan 23. The air propelled from the fan can be either entirely discharged to the atmosphere, or a portion of the air can be discharged to the atmosphere and the remainder of the air can be recirculated through duct 24 to air duct 16 at a point after the cooling and heating coils and ahead of the junction of the air duct 16 and conduit 10 containing the crystalline dextrose discharged from the mixer, under the conditions where excessively low ambient air temperatures are encountered which would otherwise require excessive use of a heatant to heat the cooling conveying air to result in cooling of the crystallized dextrose to the aforementioned temperature range of 5 to 35° C. The volume of air used in the air duct must be of such magnitude as to satisfactorily cool, dry and convey the material, and is then dependent upon the amount of crystallized dextrose used as the seed material, the amount, temperature and concentration of the concentrated dextrose-containing liquor and the temperature and humidity of the incoming air. Various combinations of these variables will be presented in the examples that follow to aid in illustrating this aspect of the invention.

Returning to FIGURE 1, the crystallized dextrose separated from the conveying air stream is discharged from the cyclone 22 through conduit 25 to a vibrating or oscillating screen 26 equipped with screening medium 26a having openings of about 0.6 to 2.0 mm. depending upon the desired particle size of the product. The material separated as the coarse fraction is discharged from the vibrating or oscillating screen through conduit 27 to a mill 28 where this relatively coarse material is ground. The ground material is returned through conduit 29 to the conveying air system for ultimate reclassification of the ground material on the screening medium of the vibrating or oscillating screen.

The material that passes through the screening medium in the oscillating or vibrating screen is discharged from the screen through a conduit 30 into a conveyor 31 and thence into a hopper 11 designed with two outlets. The design of the hopper is such that the material discharged from the conveyor is preferentially supplied to that side of the hopper which discharges the material to the pug mill mixer 5. The volume of this side of the hopper is preferably equal to the volume of the pug mill mixer in order to facilitate start-up of the operation. As the inventory in the hopper exceeds the volume of the side of the hopper that is preferentially supplied, the crystallized dextrose overflows into the side discharging the excess material into conveyor 32 and thence into the product screen 33. The crystallized dextrose is first passed over screening medium 33a usually identical in size to that of screening medium 26a to remove any coarse material formed in conveyors 31 and 32. The scalped material is discharged through conduits 34 and 27 to the mill. The scalped product passing through screen 33a is then passed over a suitable screening medium 33b which separates the crystallized dextrose into coarse fine fractions which are transferred through ducts 35 and 36, respectively, in packing hoppers 37 and 38, respectively. As shown in FIGURE 1, the coarse fraction is always packed as product since the fraction is preferred as an article of commerce because of its relatively nondusting characteristic and ease of handling. Depending on the demand for the fine fraction, this can either be discharged in packing hopper 38, or if demand does not warrant production of this size fraction of sugar, the fine fraction can be returned to the system through conduit 38 by resetting diverter 40 and can then be utilized to produce a coarse fraction of crystallized dextrose.

Another embodiment of the process is shown in FIGURE 4 which utilizes a fluidized bed cooler, as for example that described and claimed in copending U.S. application Serial No. 126,271, filed July 24, 1961, now abandoned. In the embodiment shown in FIGURE 4, the commingled and essentially completely crystallized material is discharged from the pug mill mixer 5 through conduit 10 into the dome portion 41 of a fluidized bed apparatus. The crystallized product is cooled by a combination of evaporative cooling and indirect heat exchange in the heat exchanger section 42 of the fluidized bed system. The heat exchanger section consists of a multiplicity of 75 mm. outer diameter (1.7 mm. wall thickness) by 1.5 meter long tubes arranged on an 82½ mm. V-pitch. Cooling water is introduced into the bottom of the discharge section on the outside of the multiplicity of heat exchange tubes and the coolant is discharged from the heat exchanger section. The commingled and essentially completely crystallized product is contained on the inside of the heat exchange tubes and is maintained in a fluidized state by use of a gaseous medium, such as air, which is introduced into the plenum chamber 43 wherein the air is uniformly distributed through the multiplicity of heat exchange tubes. The crystallized product undergoing evaporative cooling and indirect cooling flows essentially countercurrent to the fluidizing medium, in that the crystallized product enters the fluidized bed cooler through the dome, flows down through the heat exchange tubes into conduits which discharge the crystallized product into the discharge hopper 44 of the fluidized bed cooler. The rate of discharge is controlled by a rotary feeder 45, or other suitable device, at a rate which is equal to the rate of input into the dome section of the fluidized bed cooler from the pug mill mixer. The rate of discharge from the fluidized bed cooler can be matched with that input rate by maintaining a constant level in the dome section by a level detector 41a which transmits a signal to the rotary air lock prime mover controller to vary the speed, as required, of the prime mover to maintain a discharge rate equivalent to the input rate.

The fluidizing medium is essentially disengaged from the solids in the dome section of the fluidized bed cooler above the operating level of the product in the dome section. The fluidizing medium flows from the dome section through a duct 47 into a dust collector 48 wherein traces of the product dust is recovered from the fluidizing medium. The fluidizing medium flows from the dust collector 48 through a duct 50 by virtue of the action of the blower 51 which discharges the fluidizing medium ultimately to the atmosphere.

The crystallized dextrose discharged from the fluidized bed cooler flows through conduit 46 to a mechanical conveying and elevating device 52. Similarly, the dust recovered in dust cyclone 48 flows through conduit 49 to the mechanical conveying and elevating device 52. The combined streams are conveyed and elevated so that they are discharged through conduit 53 for the required coarse classification step in a vibrating or oscillating screen 26.

The fluidized bed design described above is by way of illustration only and is no way limiting in the method of cooling since it should be obvious from the discussion on the cooling-conveying system discussed in relation to FIGURE 1 that a fluidized bed system can employ the fluidizing medium only as the cooling and drying agent, exclusive of any means of indirect heat transfer. The advantage of a fluidized bed utilizing direct and indirect heat transfer would be realized only when more heat is available in the forms of sensible heat in the hot concentrated liquor and heat of crystallization than is required to evaporate the remaining water in the crystallized product, e.g., when the total hydrolysate or dextrose liquor has a dry substance content of about 98 percent.

The following examples, which are typical and intended to be informative only and in no way limiting, will further illustrate the invention. The total hydrolysates treated were prepared by commercially known processes by converting corn starch with acid and saccharifying enzymes or with liquefying and saccharifying enzymes. They were refined in known manner either with (a) vegetable carbon, or (b) cation and anion-exchanging resins, or (c) both. Examples 1 and 2 are set forth in detail. Examples 3, 4, 5, 10 and 11 were carried out in accordance with the procedure of Example 1. Examples 6, 7, 8, 9 and 12 were carried out in essentially the same manner as Example 2. The conditions under which all of the examples were carried out are summarized in Table I. Table II summarizes the analyses of the products obtained.

*Example 1*

Corn starch was subjected to an enzymic conversion using alpha-amylase and glucamylase for liquefaction and saccharification of the starch. The hydrolysate, having a dextrose equivalent of 98.6 percent, was refined using vegetable carbon and was evaporated to 92.1 percent dry substance in an evaporator, operating at an internal pressure of 0.72 kg./cm.$^2$ absolute. The temperature of the concentrated liquor was 116° C. and steam in the jacket of the evaporator was maintained at 166° C. The concentrated liquor was sprayed continuously into the pug mill mixer through one nozzle at a rate of 114 kilograms per hour at a pressure of 2.1 to 4.5 kg./cm.$^2$. Previously dried and crystallized dextrose was supplied continuously to the pug mill mixer at a rate of 1,860 kilograms per hour and at a temperature of 36° C. The shafts of the pug mill mixer were rotated at 140 revolutions per minute. The commingled and essentially crystallized material was discharged from the pug mill mixer at a temperature of 49° C. after being held therein for approximately 8.5 minutes. The pug mill mixer was maintained under a slight negative pressure with respect to atmospheric pressure by withdrawing air at a rate of 2.0 standard cubic meters per minute at a temperature of 48° C.

The commingled and essentially crystallized material was discharged into a pneumatic-cooling conveying system wherein air at a temperature of 32° C. was used to dry and cool the material to a temperature of 36° C. The crystallized dextrose was separated from the air stream by a cyclone and the separated material was then screened in a rotary sifter through screening medium having an average opening of 1.03 mm. Crystallized dextrose removed as oversize was ground in a comminuting mill until the size of the oversize fraction was reduced thereby permitting this fraction to pass through the screening medium. All of the material passing through the screening medium was conveyed to a hopper where the majority of the cooled, dried and crystallized product was returned continuously to the pug mill mixer to serve as a seed bed for subsequent crystallization of concentrated liquor containing dextrose.

A portion of the cooled, dried and crystallized product was removed from the aforementioned hopper at a rate approximately equivalent to the rate at which concentrated liquor was sprayed into the pug mill mixer. This portion of crystallized product was conveyed to a reciprocating screen and screened first through screening medium with an average opening of 1.03 mm. to remove, or "scalp," any oversize fraction formed in conveying equipment used to convey the crystallized product from the initial screening equipment into the hopper and from the hopper to the secondary, or product, screening equipment. The crystallized product passing through the screening medium that "scalps" the product was then rescreened on screening medium having an average opening of 0.394 mm. The fraction passing through the finer screening medium was conveyed ultimately to the hopper supplying crystallized product to the pug mill mixer and to the secondary, or product, screening equipment. The fraction retained on the finer screening medium of the secondary, or product, screening equipment was discharged from the screening equipment into a packing hopper and the final product was packed into bags. The product contained 1.2 percent moisture as compared to the concentrated liquor which contained 7.9 percent moisture. The reduction in moisture content between the input liquor and output product streams occurred as a result of evaporative cooling when the commingled and essentially crystallized material was contacted by the air used in the pneumatic cooling-conveying system.

*Example 2*

Corn starch was acid converted to a hydrolysate having a reducing sugar content of 13.2 percent, dry basis. The hydrolysate was clarified in a pressure filter to remove insolubles present in the hydrolysate and the hydrolysate was then saccharified with amylase to a hydrolysate having a dextrose equivalent of 95.5 percent, and containing 94 percent dextrose, 2.2 percent disaccharides, 1.3 percent trisaccharides, 1.0 percent tetrasaccharides, 0.9 percent pentasaccharides and 0.6 percent higher polysaccharides, as shown by paper strip chromatograms. The hydrolysate was refined by use of cation and anion-exchanging resins. The refined hydrolysate was evaporated to a concentration of 90.8 percent in an evaporator operating at atmospheric pressure. The temperature of the concentrated liquor was 113° C. and steam in the jacket of the evaporator was maintained at 176° C. The concentrated liquor was sprayed continuously into the pug mill mixer at a rate of 142 kilograms per hour through two nozzles operated at 3.8 to 8.8 kg./cm.$^2$.

Previously dried and crystallized product was supplied continuously to the pug mill mixer at a rate of 1,860 kilograms per hour and at a temperature of 31° C. The shafts of the pug mill mixer were operated at 133 revolutions per minute. The commingled and essentially crystallized material was discharged from the pug mill mixer at a temperature of 53° C. after being held in the pug mill mixer for approximately 8.3 minutes. The pug mill mixer was maintained under a slight negative pressure with respect to atmospheric pressure by withdrawing air at the rate of 1.4 standard cubic meters per minute at a temperature of 42° C. The commingled and essentially crystallized material was discharged into a fluidized bed cooler where air at a temperature of 28° C. was introduced into the fluidized bed at a rate of 3.16 standard cubic meters per minute to fluidize the material. The fluidizing air was discharged at a temperature of 44° C. In addition, water was introduced into the indirect hear exchanger of the fluidized bed cooler at the rate of 152 liters per minute. Temperatures of the water entering and leaving the heat exchanger were 11 and 12° C., respectively. The cooled and dried product was conveyed to a reciprocating screen equipped with a screening medium having openings with an average size of 0.73 mm. The coarse fraction separated by the screening medium was reduced in size by a comminuting mill. The crystallized material passing through the screening medium was conveyed to the hopper where a major portion of the same was supplied continuously to the pug mill mixer. The remainder of the crystallized material was conveyed to a reciprocating screen where it was separated by first passing it through a screening medium having openings with an average size of 0.79 mm. and then over a screening medium having openings with an average size of 0.33 mm. The "overs" from the coarse screen were reduced in size by the comminuting mill and the "throughs" from the fine screen were conveyed to the hopper supplying the pug mill mixer and the secondary, or product, screening equipment. The product contained 1.2 percent water as compared to 9.2 per cent water in the liquor being sprayed onto the seed bed. This example illustrates that indirect, as well as direct heat transfer, can be used to remove the heat generated in the process. The fluidizing air served as the vapor carrier for the water removed from the process.

The product, packed in 45-kilograms quantities in 5-ply plain paper bags as produced, was stored under ambient conditions that varied from 32° C. and 55 percent relative humidity to 5° C. and 86 percent relative humidity for a period of 324 days. To further simulate ware-

TABLE I

EVAPORATIVE COOLING SYSTEM

| Example No. | Type of Refining | Liquor Characteristics | | | Temperature, °C. | Liquor Spray Rate, kg./hour | Pressure at Spray Nozzles, kg./cm.² | | Supply [1] Rate of Seed, kg./hour |
|---|---|---|---|---|---|---|---|---|---|
| | | Dextrose Equivalent, percent | Dextrose, percent d.b. | Dry Substance, percent | | | | | |
| 1 | a | 98.6 | -------- | 92.1 | 116 | 113 | 2.10 | 4.6 | 1,860 |
| 3 | b | 97.7 | 94.0 | 92.5 | 121 | 175 | 3.50 | 7.0 | 1,860 |
| 4 | b | 97.7 | -------- | 92.5 | 121 | 175 | 3.50 | 7.0 | 1,860 |
| 5 | c | 97.6 | -------- | 91.2 | 113 | 178 | 2.45 | 4.2 | 1,860 |
| 10 | b | 95.9 | -------- | 95.2 | 129 | 141 | 3.50 | 6.3 | 1,860 |
| 11 | b | 98.4 | -------- | 93.2 | 128 | 394 | 4.3 | 4.5 | 2,500 |

COMBINATION OF EVAPORATIVE COOLING AND INDIRECT HEAT EXCHANGER

| 2 | b | 95.5 | 94.0 | 90.8 | 113 | 142 | 3.8 | 8.8 | 1,860 |
| 6 | c | 97.1 | -------- | 92.5 | 112 | 149 | 3.1 | 5.6 | 1,860 |
| 7 | c | [2] 97.7 | -------- | 90.6 | 124 | 159 | 4.0 | 7.4 | 1,860 |
| 8 | c | 96.5 | -------- | 91.6 | 118 | 160 | 2.80 | 4.9 | 1,860 |
| 9 | c | 96.5 | -------- | 89.9 | 117 | 162 | 2.80 | 3.5 | 1,860 |
| 12 | | | 98.7 | 94.4 | 143 | 189 | 9.1 | 10.8 | [3] 2,710 |

EVAPORATIVE COOLING SYSTEM

| Example No. | Temperature of Seed, °C. | Mixer Rotor Speed, r.p.m. | Mixing Time, minutes | Temperature of Crystallized Product, °C. | Cooking or Fluidizing Air Temperature, °C. | Cooling Water Rate, l./minute | Cooling Water Temperature, °C. | | Temperature of Cooled Crystallized Product, °C. |
|---|---|---|---|---|---|---|---|---|---|
| | | | | | | | In | Out | |
| 1 | 36 | 140 | 8.5 | 49 | 32 | -------- | -------- | -------- | 36 |
| 3 | 27 | 140 | 8.1 | 51 | 18 | -------- | -------- | -------- | 27 |
| 4 | 27 | 140 | 8.1 | 48 | 9 | -------- | -------- | -------- | 27 |
| 5 | 32 | 140 | 8.1 | 46 | 22 | -------- | -------- | -------- | 32 |
| 10 | 32 | 140 | 8.4 | 54 | 27 | -------- | -------- | -------- | 32 |
| 11 | 27 | 140 | 5.8 | 53 | 17 | -------- | -------- | -------- | 27 |

COMBINATION OF EVAPORATIVE COOLING AND INDIRECT HEAT EXCHANGER

| 2 | 31 | 135 | 8.4 | 53 | 28 | 152 | 11 | 12 | 31 |
| 6 | 41 | 140 | 8.3 | 61 | | Experiment Terminated | | 14 | 35 |
| 7 | 35 | 140 | 8.3 | 48 | 27 | 57 | 11 | 13 | 32 |
| 8 | 32 | 180 | 7.9 | 46 | 25 | 57 | 11 | 14 | 33 |
| 9 | 33 | 100 | 8.8 | 49 | 25 | 57 | 12 | 14 | 33 |
| 12 | 35 | 140 | 5.7 | 51 | 26 | 152 | 7 | 11 | 35 |

[1] Seed used was material crystallized in a preceding run except as noted.
[2] Obtained by enzymic conversion of sweet potato starch.
[3] Alpha-anhydrous dextrose used as seed.

TABLE II

| Example No | 1 | 3 | 4 | 5 | 10 | 11 | 2 | 6 | 7 | 8 | 9 | 12 |
|---|---|---|---|---|---|---|---|---|---|---|---|---|
| Dry substance, percent | 98.8 | 98.2 | 97.7 | 97.9 | 98.4 | 98.4 | 98.8 | 98.9 | 99.0 | 98.4 | 97.9 | 99.2 |
| D.E., percent d.b | 98.7 | 97.7 | 97.7 | 98.2 | 95.9 | 98.4 | 95.6 | | 97.3 | | | 99.3 |
| Beta-dextrose, percent d.b | 64.2 | 50.0 | 48.4 | | 47.9 | | 49.5 | 52.0 | 52.1 | 47.2 | | 24.8 |
| Sulfated ash, percent d.b | 0.28 | | 0.01 | 0.05 | | 0.016 | 0.022 | | 0.034 | 0.04 | 0.04 | |
| Protein, percent d.b | 0.10 | | 0.01 | 0.02 | | 0.025 | 0.008 | | Nil | 0.01 | 0.01 | |

SCREEN ANALYSES IN PERCENT RETAINED ON SCREEN

| Sieve opening in mm.: | | | | | | | | | | | | |
|---|---|---|---|---|---|---|---|---|---|---|---|---|
| 1.19 | 0.2 | | | 0.0 | | | | | | | | |
| 0.84 | | | | | 0.1 | | | | | | | |
| 0.71 | | | | | | | 18.2 | | | | | Trace |
| 0.59 | 14.3 | 0.1 | 0.8 | 9.4 | 9.7 | 19.1 | | | 0.0 | 1.0 | 1.0 | 0.4 |
| 0.50 | | | | | | | | 8.2 | 11.5 | | | |
| 0.42 | 59.5 | 25.7 | 36.8 | 41.4 | 42.0 | 56.4 | 21.2 | | 25.3 | 28.8 | 32.8 | 28.0 |
| 0.35 | | | | | | | 42.4 | | 40.0 | | | |
| 0.297 | 87.0 | 66.7 | | 84.5 | 85.0 | 73.5 | 61.4 | | 56.1 | 68.6 | 77.0 | |
| 0.250 | 96.7 | | | 98.3 | 97.8 | | | | | | | |
| 0.210 | | 90.6 | 95.2 | 100.0 | | 92.0 | 94.6 | | 83.3 | 94.0 | 96.6 | 87.6 |
| 0.149 | 100.0 | 98.1 | 99.6 | | 99.2 | 96.5 | 99.2 | | 95.6 | 99.2 | 100.0 | 95.6 | house storage conditions, sufficient lead pigs were stacked on the bags to produce a pressure of 0.45 to 0.56 kg./cm.$^2$. At the end of this period, the beta-anhydrous dextrose content of the product was determined as 44.7 percent, which shows the high stability of this product since the beta-anhydrous dextrose content had decreased only 4.8 percent. The product was essentially free-flowing since movement of the bags resulted in the breaking up of any apparently caked product contained in the bag.

It should be noted that in Example 6 the commingled liquor and seed had a temperature of 60.5° C. which was unsuitable for further handling. Operation of the pug mill mixer was discontinued because the mixture was too viscous and doughy to handle whereas at temperatures within the range specified a pulverulent material was always obtained.

The products of the present invention have excellent rates of solution. The product from Example 4 is illustrative. A solution of this product containing 48 percent dry substance is formed at 25° C. in 2 minutes whereas approximately 3 hours are required to produce a solution of equal concentration from either alpha-dextrose hydrate or alpha-anhydrous dextrose. Moreover, the solubility does not decrease with time as is the case for alpha-anhydrous dextrose.

The product prepared by the process from starch hydrolysate that has been refined by the combination of ion-exchange resins and vegetable carbon cannot be distinguished in taste from dextrose prepared by normal methods of crystallization. The product is white in color and has similar color keeping properties to dextrose crystallized conventionally, in that the color of the dextrose crystallized by this process increases at the same rate that the color increases for conventionally crystallized dextrose. The product consists of agglomerated microcrystals, and since the product is produced by agglomeration, the particle size can be made as small or as large as desired. A larger particle is preferred inasmuch as the dusting tendency of the product is reduced, which in turn, simplifies handling of the crystallized dextrose by the consumer.

I claim:

1. A process for obtaining a substantially anhydrous dextrose containing at least about 40 percent anhydrous beta-dextrose which dissolves readily in water and is stable against loss of beta-dextrose content which comprises spraying a dextrose liquor having a temperature between about 107 to about 150° C. onto a seed bed which is agitated and has a temperature between about 10 and 40° C., continuously and intimately mixing said liquor and said seed bed in a mixing zone for a short period of time to induct substantially complete crystallization of the dextrose in said liquor, discharging the substantially crystallized resultant material from said mixing zone at a temperature of about 32 to 60° C. into a stream of air having a temperature of about 5 to 35° C. and simultaneously cooling said crystallized product to a temperature of about 10 to 40° C. and evaporating residual moisture therefrom by means of the sensible heat from said liquor and the heat of crystallization of the dextrose; said dextrose liquor containing at least about 90 percent of dextrose and about 88 to 98 percent dry substance; said seed bed consisting essentially of dextrose crystals.

2. Process according to claim 1 wherein the seed bed consists of a portion of the final product.

3. Process according to claim 1 wherein the time for mixing said liquor and said seed bed is about 5 to 15 minutes.

4. Process according to claim 1 wherein said simultaneous cooling of said product and evaporating residual moisture therein is accomplished by direct heat and mass transfer.

5. Process according to claim 4 wherein the relative humidity of said stream of air does not exceed about 60 percent.

6. Process according to claim 1 wherein said simultaneous cooling of said product and evaporating residual moisture therein is accomplished by a combination of indirect heat transfer and direct heat and mass transfer.

7. Process according to claim 6 wherein the relative humidity of said stream of air does not exceed about 60 percent.

References Cited by the Examiner

UNITED STATES PATENTS 2,369,231   2/1945   Harding _____ 127—60 X
2,854,359   9/1958   Wilson et al. _____ 127—30

MORRIS O. WOLK, *Primary Examiner.*

MICHAEL E. ROGERS, *Assistant Examiner.*